(12) United States Patent
Kusafuka et al.

(10) Patent No.: US 11,693,240 B2
(45) Date of Patent: Jul. 4, 2023

(54) THREE-DIMENSIONAL DISPLAY DEVICE, THREE-DIMENSIONAL DISPLAY SYSTEM, HEAD-UP DISPLAY, AND MOVABLE OBJECT

(71) Applicants: KYOCERA Corporation, Kyoto (JP); UNIVERSITY PUBLIC CORPORATION OSAKA, Osaka (JP)

(72) Inventors: Kaoru Kusafuka, Tokyo (JP); Hideya Takahashi, Kashiwara (JP); Goro Hamagishi, Toyonaka (JP)

(73) Assignees: KYOCERA Corporation, Kyoto (JP); UNIVERSITY PUBLIC CORPORATION OSAKA, Osaka (JP)

( * ) Notice: Subject to any disclaimer, the term of this patent is extended or adjusted under 35 U.S.C. 154(b) by 22 days.

(21) Appl. No.: 17/415,325

(22) PCT Filed: Dec. 18, 2019

(86) PCT No.: PCT/JP2019/049675
§ 371 (c)(1),
(2) Date: Jun. 17, 2021

(87) PCT Pub. No.: WO2020/130447
PCT Pub. Date: Jun. 25, 2020

(65) Prior Publication Data
US 2022/0075188 A1    Mar. 10, 2022

(30) Foreign Application Priority Data

Dec. 21, 2018 (JP) .............................. JP2018-239438

(51) Int. Cl.
*G02B 30/20* (2020.01)
*G02B 27/01* (2006.01)

(52) U.S. Cl.
CPC .......... *G02B 27/0101* (2013.01); *G02B 30/20* (2020.01); *G02B 2027/0138* (2013.01); *G02B 2027/0192* (2013.01)

(58) Field of Classification Search
CPC .... G02B 27/01; G02B 27/0101; G02B 30/20; G02B 2027/0138; G02B 2027/0192;
(Continued)

(56) References Cited

U.S. PATENT DOCUMENTS

| 5,949,390 A | 9/1999 | Nomura et al. |
| 2011/0006979 A1 | 1/2011 | Min et al. |

(Continued)

FOREIGN PATENT DOCUMENTS

| CN | 103621077 A | 3/2014 |
| JP | H08-050280 A | 2/1996 |

(Continued)

*Primary Examiner* — Vijay Shankar
*Assistant Examiner* — Cory A Almeida
(74) *Attorney, Agent, or Firm* — Studebaker & Brackett PC

(57) ABSTRACT

A three-dimensional display device includes a display panel, a barrier panel, and a controller that controls the display panel and the barrier panel. The controller defines multiple first image areas and multiple second image areas in the display panel, causes the first image areas to be at first intervals in a first direction, causes displaying of a first image viewable by a first eye of a user in the first image areas and a second image viewable by a second eye of the user in the second image areas, defines, in the barrier panel, multiple first transmissive areas transmissive to the image light at a first transmissivity and multiple second transmissive areas transmissive to the image light at a second transmissivity, causes the first transmissive areas to be at second intervals in the first direction, and performs an irregular process at third intervals in the first direction.

18 Claims, 10 Drawing Sheets

(58) Field of Classification Search
CPC .............. G02B 27/0093; G02B 30/31; G02B 2027/0134; G02B 2027/0187; B60K 35/00; B60K 2370/1529; B60K 2370/1531; H04N 13/31; H04N 13/312; H04N 13/315; H04N 13/317; H04N 13/363; H04N 13/398
See application file for complete search history.

(56) References Cited

U.S. PATENT DOCUMENTS

| | | | |
|---|---|---|---|
| 2014/0098205 | A1 | 4/2014 | Usukura et al. |
| 2016/0327791 | A1* | 11/2016 | Kasano .................. G02B 30/27 |
| 2017/0155893 | A1* | 6/2017 | Mather ............... H04N 13/376 |
| 2017/0230642 | A1* | 8/2017 | Suzuki .................... G09G 3/36 |

FOREIGN PATENT DOCUMENTS

| | | |
|---|---|---|
| JP | H09-015549 A | 1/1997 |
| JP | 2011-018049 A | 1/2011 |
| JP | 2017-138498 A | 8/2017 |
| WO | 2015145934 A1 | 10/2015 |

* cited by examiner

THREE-DIMENSIONAL DISPLAY DEVICE, THREE-DIMENSIONAL DISPLAY SYSTEM, HEAD-UP DISPLAY, AND MOVABLE OBJECT

CROSS-REFERENCE TO RELATED APPLICATION

This application claims priority to Japanese Patent Application No. 2018-239438 filed on Dec. 21, 2018 in Japan, the entire disclosure of which is incorporated herein by reference.

FIELD

The present disclosure relates to a three-dimensional display device, a three-dimensional display system, a head-up display, and a movable object.

BACKGROUND

To allow a user to view a three-dimensional (3D) image without glasses, a known display device includes a barrier panel that directs image light from a display panel separately to the right eye and the left eye of the user. For example, a 3D display device described in Japanese Unexamined Patent Application Publication No. 8-50280 includes a barrier panel including two facing substrates with different thicknesses to shorten the proper viewing distance.

BRIEF SUMMARY

A three-dimensional display device according to one aspect of the present disclosure includes a display panel, a barrier panel, and a controller. The display panel displays a plurality of images. The barrier panel is at a position overlapping the display panel to change a relative attenuation amount of image light emitted from the display panel. The controller controls the display panel and the barrier panel. The controller defines a plurality of first image areas and a plurality of second image areas in the display panel. The controller causes the plurality of first image areas to be at first intervals in a first direction. The controller causes the display panel to display, in the plurality of first image areas, a first image viewable by a first eye of a user. The controller causes the display panel to display, in the plurality of second image areas, a second image viewable by a second eye of the user. The controller defines a plurality of first transmissive areas and a plurality of second transmissive areas in the barrier panel. The plurality of first transmissive areas are transmissive to the image light at a first transmissivity. The plurality of second transmissive areas are transmissive to the image light at a second transmissivity. The controller causes the plurality of first transmissive areas to be at second intervals in the first direction. The controller performs an irregular process at third intervals in the first direction.

A three-dimensional display system according to another aspect of the present disclosure includes a position detector and a three-dimensional display device. The three-dimensional display device includes a display panel, a barrier panel, and a controller. The position detector detects a position of an eye of a user. The display panel displays a plurality of images. The barrier panel is at a position overlapping the display panel to change a relative attenuation amount of image light emitted from the display panel. The controller controls the display panel and the barrier panel. The controller defines a plurality of first image areas and a plurality of second image areas in the display panel. The controller causes the plurality of first image areas to be at first intervals in a first direction. The controller causes the display panel to display, in the plurality of first image areas, a first image viewable by a first eye of a user. The controller causes the display panel to display, in the plurality of second image areas, a second image viewable by a second eye of the user. The controller defines a plurality of first transmissive areas and a plurality of second transmissive areas in the barrier panel. The plurality of first transmissive areas are transmissive to the image light at a first transmissivity. The plurality of second transmissive areas are transmissive to the image light at a second transmissivity. The controller causes the plurality of first transmissive areas to be at second intervals in the first direction. The controller performs an irregular process at third intervals in the first direction.

A head-up display according to another aspect of the present disclosure includes a three-dimensional display device and a projection receiver. The projection receiver includes a projection screen. The three-dimensional display device includes a display panel, a barrier panel, and a controller. The display panel displays a plurality of images. The barrier panel is at a position overlapping the display panel to change a relative attenuation amount of image light emitted from the display panel. The controller controls the display panel and the barrier panel. The controller defines a plurality of first image areas and a plurality of second image areas in the display panel. The controller causes the plurality of first image areas to be at first intervals in a first direction. The controller causes the display panel to display, in the plurality of first image areas, a first image viewable by a first eye of a user. The controller causes the display panel to display, in the plurality of second image areas, a second image viewable by a second eye of the user. The controller defines a plurality of first transmissive areas and a plurality of second transmissive areas in the barrier panel. The plurality of first transmissive areas are transmissive to the image light at a first transmissivity. The plurality of second transmissive areas are transmissive to the image light at a second transmissivity. The controller causes the plurality of first transmissive areas to be at second intervals in the first direction. The controller performs an irregular process at third intervals in the first direction. The three-dimensional display device projects the image light onto the projection screen to allow the user to view the first image and the second image through the projection screen.

A movable object according to another aspect of the present disclosure includes a head-up display. The head-up display includes a three-dimensional display device and a projection receiver. The projection receiver includes a projection screen. The three-dimensional display device includes a display panel, a barrier panel, and a controller. The display panel displays a plurality of images. The barrier panel is at a position overlapping the display panel to change a relative attenuation amount of image light emitted from the display panel. The controller controls the display panel and the barrier panel. The controller defines a plurality of first image areas and a plurality of second image areas in the display panel. The controller causes the plurality of first image areas to be at first intervals in a first direction. The controller causes the display panel to display, in the plurality of first image areas, a first image viewable by a first eye of a user. The controller causes the display panel to display, in the plurality of second image areas, a second image viewable by a second eye of the user. The controller defines a plurality of first transmissive areas and a plurality of second transmissive areas in the barrier panel. The plurality of first transmissive areas are transmissive to the image light at a first transmissivity. The plurality of second transmissive areas are transmissive to the image light at a second transmissivity. The controller causes the plurality of first transmissive areas to be at second intervals in the first direction. The controller performs an irregular process at third intervals in the first direction. The three-dimensional display device projects the image light onto the projection screen to allow the user to view the first image and the second image through the projection screen.

DETAILED DESCRIPTION

To improve the quality of a three-dimensional (3D) image generated by a 3D display device, the barrier pitch of a barrier panel and the image pitch of a display panel are optimized. The display panel and the barrier panel with different optimum pitches are to be separately developed as dedicated panels. These panels with any pitches are designed for improved image quality.

One or more embodiments of the present disclosure will now be described with reference to the drawings.

Structure of 3D Display Device

Figure 1:
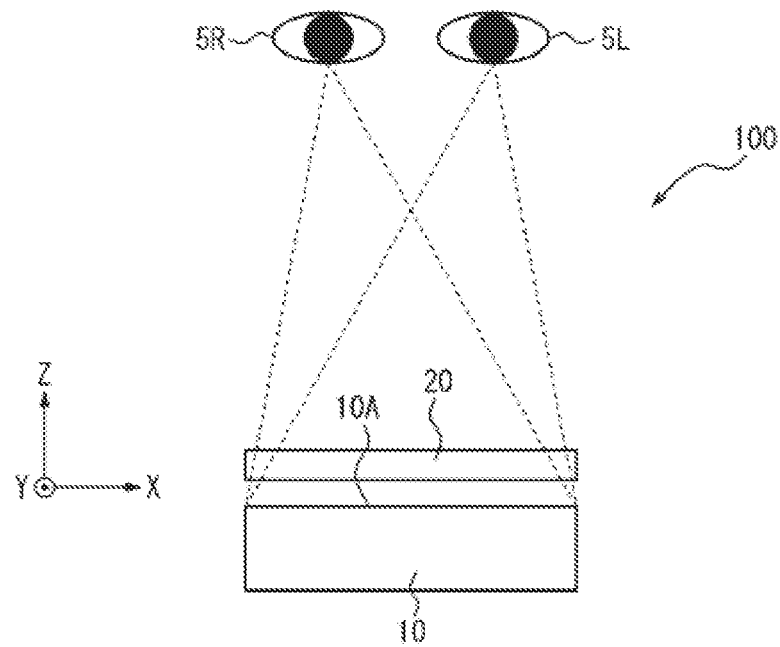
FIG. 1 is a schematic diagram of a three-dimensional (3D) display device according to an embodiment.
Figure 2:
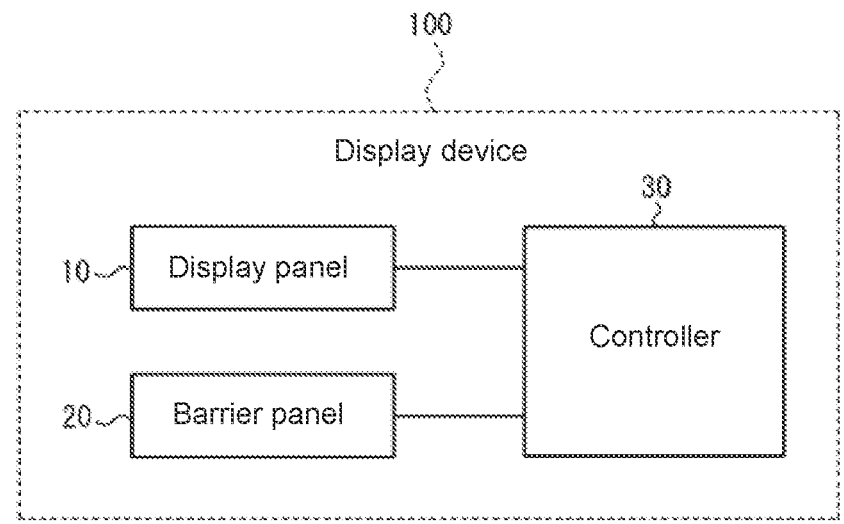
FIG. 2 is a block diagram of the 3D display device according to the embodiment.

As shown in FIGS. 1 and 2, a 3D display device 100 according to one embodiment includes a display panel 10, a barrier panel 20, and a controller 30. The display panel 10 and the barrier panel 20 are at overlapping positions.

The display panel 10 is formed from any material, and may include, for example, a transmissive liquid crystal panel, an organic electroluminescence (EL) panel, an inorganic EL panel, or another display device. The display panel 10 displays a parallax image on a display surface 10A. The parallax image includes a left-eye image and a right-eye image that has parallax with respect to the left-eye image. The left-eye image may be referred to as a first image. The right-eye image may be referred to as a second image. The left-eye image viewable by the left eye 5L of a user appears in multiple left-eye image areas (referred to as left-eye image areas PgL). The right-eye image viewable by the right eye 5R of the user appears in multiple right-eye image areas (referred to as right-eye image areas PgR). The controller 30 defines the left-eye image areas PgL and the right-eye image areas PgR in the display panel 10 to cause the left-eye image areas PgL and the right-eye image areas PgR to be alternate in X-direction. In other words, the left-eye image areas PgL and the right-eye image areas PgR are alternate in X-direction. The left eye 5L of the user may be referred to as a first eye. The right eye 5R of the user may be referred to as a second eye. The left-eye image areas PgL may be referred to as first image areas. The right-eye image areas PgR may be referred to as second image areas. X-direction corresponds to the direction in which parallax is provided to the left eye 5L and the right eye 5R of the user.

Figure 3:
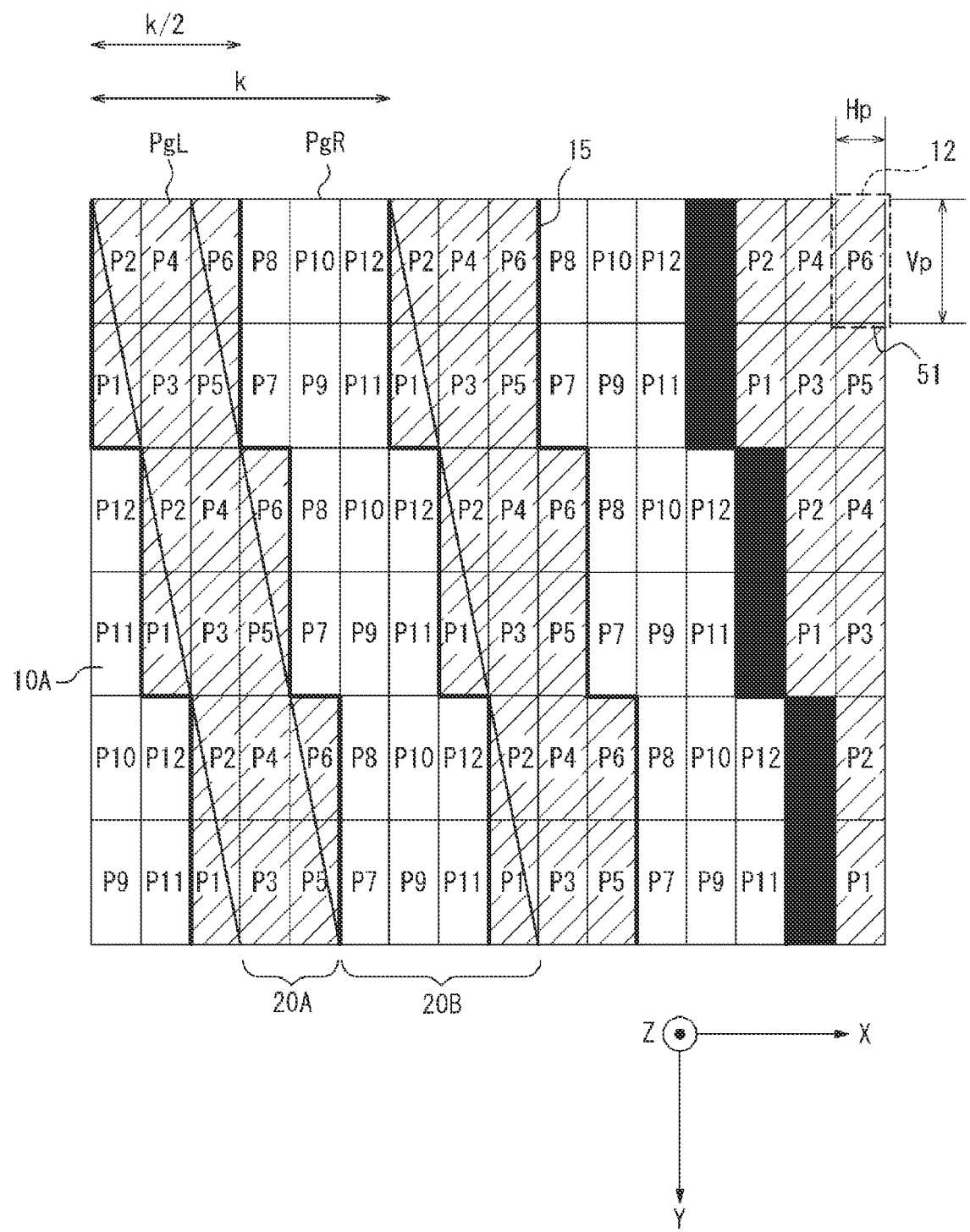
FIG. 3 is a schematic diagram of a display panel in the embodiment.

As shown in FIG. 3, the display panel 10 is divided by display boundaries 15 into the left-eye image areas PgL for emitting image light to the position of the left eye 5L of the user and the right-eye image areas PgR for emitting image light to the position of the right eye 5R of the user. The display panel 10 divided by the display boundaries 15 displays the left-eye image in the left-eye image areas PgL and the right-eye image in the right-eye image areas PgR. The user views the left-eye image appearing in the left-eye image areas PgL with the left eye 5L and the right-eye image appearing in the right-eye image areas PgR with the right eye 5R. X-direction may be referred to as a horizontal direction as viewed from the user. Y-direction may be referred to as a vertical direction as viewed from the user. Z-direction may be referred to as a depth direction as viewed from the user. X-direction may be referred to as a first direction. Y-direction may be referred to as a second direction. Z-direction may be referred to as a third direction.

The display panel 10 includes multiple cells defined by a black matrix 51 in a grid. The cells are defined in a grid in the horizontal and vertical directions on the display surface 10A. Each cell corresponds to one subpixel 12. The subpixel 12 has a horizontal length Hp and a vertical length Vp. The display panel 10 has a binocular image pitch k, which may be referred to as a first interval. With the binocular image pitch k, the display panel 10 has a monocular image pitch k/2. The image pitch is specified as appropriate by the controller 30.

In the example shown in FIG. 3, each left-eye image area PgL includes six subpixels 12. The six subpixels 12 may have, for example, subnumbers P1, P2, P3, P4, P5, and P6. A subpixel 12 with the subnumber P1 is referred to as a subpixel 12_P1. Each left-eye image area PgL may include any number of subpixels 12.

In the example shown in FIG. 3, each right-eye image area PgR includes six subpixels 12. The six subpixels 12 include, for example, subpixels 12_P7, 12_P8, 12_P9, 12_P10, 12_P11, and 12_P12. Each right-eye image area PgR may include any number of subpixels 12.

The subpixels 12 are arranged in the horizontal direction with a pitch Hp on the display surface 10A. In the example in FIG. 3, the subpixels 12 in the left-eye image areas PgL are arranged in the order of subpixels 12_P2, 12_P4, and 12_P6. The subpixels 12 in the right-eye image areas PgR are arranged in the order of subpixels 12_P8, 12_P10, and 12_P12.

The subpixels 12 are arranged in the vertical direction with a pitch Vp on the display surface 10A. In the example in FIG. 3, the subpixels 12 in the left-eye image areas PgL are arranged in the order of subpixels 12_P2 and 12_P1. The subpixels 12 in the right-eye image areas PgR are arranged in the order of subpixels 12_P12, 12_P11, 12_P10, and 12_P9.

The subpixels 12 are the basic elements controllable by the controller 30. The controller 30 controls the subpixels 12 to cause the display panel 10 to display an image. In the example in FIG. 3, each subpixel 12 is rectangular. In another example, the subpixel 12 may be in a different shape, such as square and trapezoidal.

The display panel 10 controlled by the controller 30 receives an irregular process performed at predetermined intervals in the horizontal direction on the display surface 10A. The predetermined interval may be referred to as a third interval. The irregular process will be described in detail in the first to fourth examples described later.

As shown in FIG. 3, the irregular process includes, for example, adding one or more subpixels 12 displaying a black image between left-eye image areas PgL and right-eye image areas PgR. The irregular process includes, for example, adding one or more subpixels 12 displaying a white image between left-eye image areas PgL and right-eye image areas PgR. The irregular process includes, for example, adding one or more subpixels 12 displaying an image that is included neither in the right-eye image nor in the left-eye image between left-eye image areas PgL and right-eye image areas PgR. The irregular process includes, for example, reducing one or more predetermined subpixels 12 from left-eye image areas PgL. The irregular process includes, for example, reducing one or more predetermined subpixels 12 from right-eye image areas PgR.

For example, the display panel 10 displays, at predetermined intervals, a black image on one or more predetermined subpixels 12 between subpixels 12 included in left-eye image areas PgL and subpixels 12 included in right-eye image areas PgR. The predetermined subpixel(s) 12 corresponds to one or more subpixels 12 in the area to receive the irregular process. For example, the display panel 10 displays, at predetermined intervals, a white image on one or more predetermined subpixels 12 between subpixels 12 included in left-eye image areas PgL and subpixels 12 included in right-eye image areas PgR. The predetermined subpixel(s) 12 corresponds to one or more subpixels 12 in the area to receive the irregular process.

The display panel 10 receives the irregular process performed at predetermined intervals by the controller 30. This minimizes the deviation of the barrier pitch of the barrier panel 20 and the image pitch of the display panel 10 from their optimum values. The 3D display device 100 can thus include the display panel 10 and the barrier panel 20 having, for example, the same pitch.

The barrier panel 20 includes, for example, a liquid crystal shutter. The liquid crystal elements receive a voltage controllable by the controller 30 to change light transmissivity. The barrier panel 20 is not limited to a liquid crystal shutter, but may include, for example, a microelectromechanical systems (MEMS) shutter panel.

Figure 4:
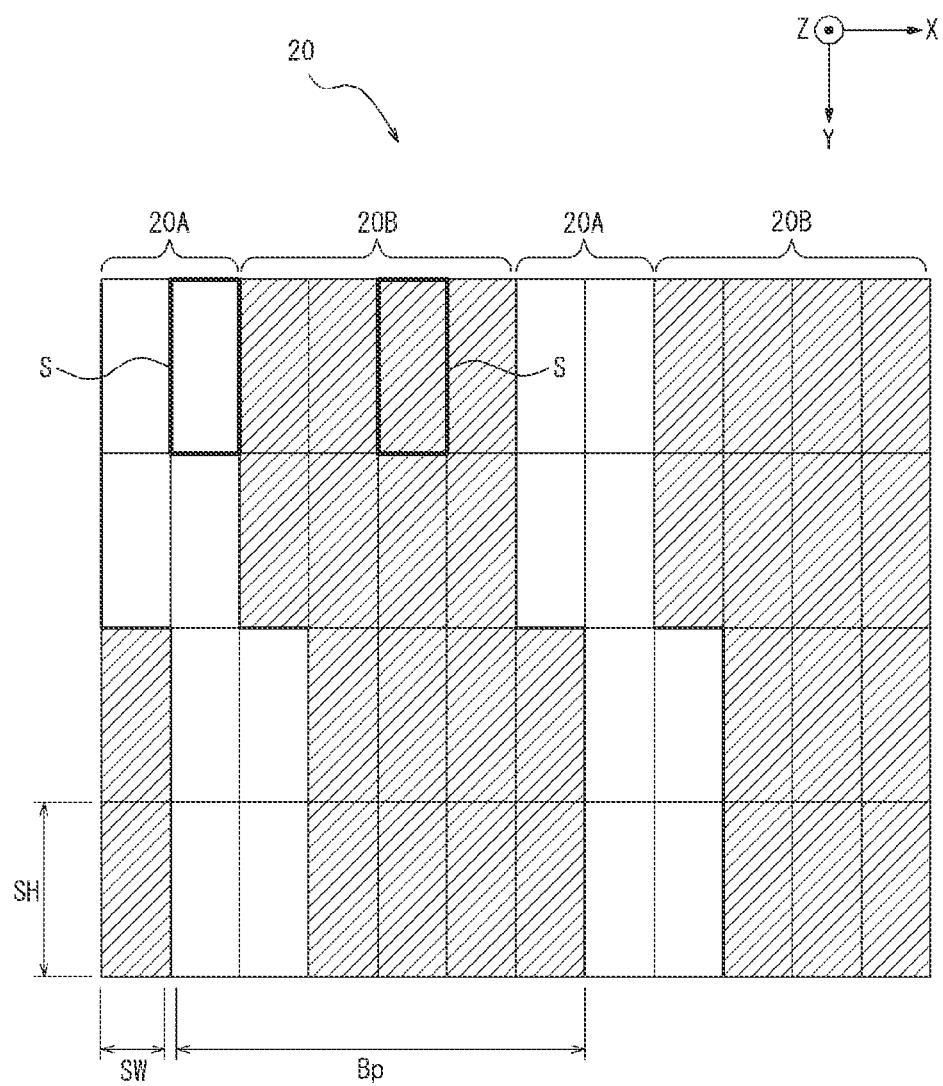
FIG. 4 is a schematic diagram of a barrier panel in the embodiment.

As shown in FIG. 4, the barrier panel 20 includes a panel surface and multiple shutter cells S defined in a grid in the horizontal and vertical directions on the panel surface. The controller 30 defines multiple light transmissive areas 20A and multiple light attenuating areas 20B in the barrier panel 20. The barrier panel 20 includes the light transmissive areas 20A and the light attenuating areas 20B. The light transmissive areas 20A may be referred to as first transmissive areas. The light attenuating areas 20B may be referred to as second transmissive areas. The light transmissive areas 20A may transmit image light emitted from the display panel 10 at a first transmissivity or greater. The first transmissivity may be, for example, 100% or close to 100%. The light attenuating areas 20B attenuate light incident on the barrier panel 20 from the display panel 10. The light attenuating areas 20B may transmit image light emitted from the display panel 10 at a second transmissivity or lower. The second transmissivity may be, for example, 0% or close to 0%. The first transmissivity is greater than the second transmissivity. In one example, the ratio of the second transmissivity to the first transmissivity is 1/100. In another example, the ratio of the second transmissivity to the first transmissivity is 1/1000. The barrier panel 20 can change the relative attenuation of image light emitted from the display panel 10. The first transmissivity is in a range of values that allow light through the light transmissive areas 20A to provide sufficient contrast to light through the light attenuating areas 20B, and may be less than 50%, such as 10%. The second transmissivity is in a range of values that allow light through the light attenuating areas 20B to provide sufficient contrast to light through the light transmissive areas 20A, and may be greater than a value close to 0%, such as 10%. The sufficient contrast ratio may be, for example, 100:1.

The barrier panel 20 defines the traveling direction of image light emitted from the display panel 10. The traveling direction of image light may be referred to as a ray direction. The barrier panel 20 defines the ray direction to determine the areas on the display surface 10A viewable by each of the right and left eyes 5R and 5L of the user. The areas viewable by the right eye 5R of the user may be referred to as right-eye viewable areas. The areas viewable by the left eye 5L of the user may be referred to as left-eye viewable areas. For example, the barrier panel 20 allows image light emitted from groups of subpixels 12 on the display surface 10A to reach the left eye 5L of the user through the light transmissive areas 20A. For example, the barrier panel 20 allows image light emitted from other groups of subpixels 12 on the display surface 10A to reach the right eye 5R of the user through the light transmissive areas 20A. The controller 30 controls the display panel 10 to align the left-eye image areas PgL with the left-eye viewable areas and the right-eye image areas PgR with the right-eye viewable areas. This allows the user to view the left-eye image with the left eye 5L and the right-eye image with the right eye 5R. The user can thus view a 3D image.

The controller 30 controls the light transmissivity of each shutter cell S in the barrier panel 20. The controller 30 controls groups of shutter cells S to be light transmissive areas 20A and other groups of shutter cells S to be light attenuating areas 20B. The light transmissive areas 20A and the light attenuating areas 20B are alternate in the horizontal direction on the panel surface. Each shutter cell S has a horizontal length SW and a vertical length SH. The barrier panel 20 has a barrier pitch Bp, which may be referred to as a second interval. The barrier pitch Bp is specified as appropriate by the controller 30. Each shutter cell S in the barrier panel 20 may be sized equal to or differently from each subpixel 12 in the display panel 10.

The shutter cells S are the basic elements controllable by the controller 30. The controller 30 controls the shutter cells S to change the light transmissive areas 20A and the light attenuating areas 20B in the barrier panel 20 in any shape.

The barrier panel 20 controlled by the controller 30 receives an irregular process performed at predetermined intervals in the horizontal direction. The predetermined interval may be referred to as a third interval. The irregular process will be described in detail in the first to fourth examples described later.

The irregular process includes, for example, adding one or more predetermined shutter cells S to light transmissive areas 20A and reducing one or more predetermined shutter cells S from light attenuating areas 20B. The irregular process includes, for example, adding one or more predetermined shutter cells S to light attenuating areas 20B and reducing one or more predetermined shutter cells S from light transmissive areas 20A.

For example, the barrier panel 20 may add, at predetermined intervals, one shutter cell S to light transmissive areas 20A in the horizontal direction and may reduce, at predetermined intervals, one shutter cell S from light attenuating areas 20B in the horizontal direction. For example, the barrier panel 20 may add, at predetermined intervals, one shutter cell S to light attenuating areas 20B in the horizontal direction and may reduce, at predetermined intervals, one shutter cell S from light transmissive areas 20A in the horizontal direction.

For example, the barrier panel 20 may add, at predetermined intervals, two shutter cells S to light transmissive areas 20A in the horizontal direction and may reduce, at predetermined intervals, two shutter cells S from light attenuating areas 20B in the horizontal direction. For example, the barrier panel 20 may add, at predetermined intervals, two shutter cells S to light attenuating areas 20B in the horizontal direction and may reduce, at predetermined intervals, two shutter cells S from light transmissive areas 20A in the horizontal direction.

The controller 30 controls the barrier pitch Bp of the barrier panel 20 as appropriate to minimize the deviation of the barrier pitch and the image pitch from their optimum values. The 3D display device 100 can thus include the display panel 10 and the barrier panel 20 having, for example, the same pitch.

The controller 30 is connectable to the components in the 3D display device 100 to control these components. The controller 30 may be, for example, a processor. The controller 30 may include one or more processors. The processors may include a general-purpose processor that reads a specific program to perform a specific function and a processor dedicated to specific processing. The dedicated processor may include an application-specific integrated circuit (ASIC). The processor may include a programmable logic device (PLD). The PLD may include a field-programmable gate array (FPGA). The controller 30 may either be a system on a chip (SoC) or a system in a package (SiP) in which one or more processors cooperate with other components. The controller 30 may include a storage. The controller 30 may store various items of information or programs to operate each component in the 3D display device 100. The storage may be, for example, a semiconductor memory. The storage may serve as a work memory for the controller 30.

The controller 30 controls the subpixels 12 in each left-eye image area PgL in the display panel 10 to display a part of a left-eye image. For example, the controller 30 controls the subpixels 12_P1 to 12_P6 in each left-eye image area PgL in the display panel 10 to display a part of a left-eye image.

The controller 30 controls the subpixels 12 in each right-eye image area PgR in the display panel 10 to display a part of a right-eye image. For example, the controller 30 controls the subpixels 12_P7 to 12_P12 in each right-eye image area PgR in the display panel 10 to display a part of a right-eye image.

The controller 30 controls one or more predetermined subpixels 12 in the display panel 10 to display a black image. The predetermined subpixel(s) 12 corresponds to the subpixels 12 in the area to receive the irregular process. The black image includes an image with a predetermined luminance level of, for example, black. The predetermined luminance level may be specified to correspond to the lowest gradation displayable by the subpixels 12 or to correspond to a gradation equivalent to the lowest gradation.

The controller 30 controls one or more predetermined subpixels 12 in the display panel 10 to display a white image. The predetermined subpixel(s) 12 correspond to the subpixels 12 in the area to receive the irregular process. The white image includes an image with a predetermined luminance level of, for example, white. The predetermined luminance level may be specified to correspond to the highest gradation displayable by the subpixels 12 or to correspond to a gradation equivalent to the highest gradation.

The controller 30 performs the irregular process at predetermined intervals. In the example shown in FIG. 3, the controller 30 performs the irregular process including controlling one or more predetermined subpixels 12 to display, at predetermined intervals, a black image. The predetermined subpixel(s) 12 are between subpixels 12 included in left-eye image areas PgL and subpixels 12 included in right-eye image areas PgR. For example, the controller 30 performs the irregular process including controlling one or more predetermined subpixels 12 to display, at predetermined intervals, a white image. The predetermined subpixel (s) 12 are between subpixels 12 included in left-eye image areas PgL and subpixels 12 included in right-eye image areas PgR.

For example, the controller 30 performs the irregular process including controlling one or more predetermined subpixels 12 to display, at predetermined intervals, an image that is included neither in the right-eye image nor in the left-eye image. The predetermined subpixel(s) 12 are between subpixels 12 included in left-eye image areas PgL and subpixels 12 included in right-eye image areas PgR. For example, the controller 30 performs the irregular process including reducing, at predetermined intervals, the number of subpixels 12 included in left-eye image areas PgL. For example, the controller 30 performs the irregular process including reducing, at predetermined intervals, the number of subpixels 12 included in right-eye image areas PgR.

The controller 30 controls the shutter cells S in the barrier panel 20 to define the light transmissive areas 20A that transmit image light from the display panel 10 at the first transmissivity or greater. The controller 30 controls the shutter cells S in the barrier panel 20 to define the light attenuating areas 20B that transmit image light from the display panel 10 at the second transmissivity or less.

The controller 30 performs the irregular process at predetermined intervals. For example, the controller 30 adds, at predetermined intervals, one or more predetermined shutter cells S to light transmissive areas 20A and reduces, at predetermined intervals, one or more predetermined shutter cells S from light attenuating areas 20B. For example, the controller 30 adds, at predetermined intervals, one or more predetermined shutter cells S to light attenuating areas 20B and reduces, at predetermined intervals, one or more predetermined shutter cells S from light transmissive areas 20A.

For example, the controller 30 adds, at predetermined intervals, one shutter cell S to light transmissive areas 20A in the horizontal direction and reduces, at predetermined intervals, one shutter cell S from light attenuating areas 20B. For example, the controller 30 adds, at predetermined intervals, one shutter cell S to light attenuating areas 20B in the horizontal direction and reduces, at predetermined intervals, one shutter cell S from light transmissive areas 20A.

The controller 30 may calculate the predetermined interval based on the total deviation of the image pitch k and the barrier pitch Bp in the horizontal direction. The controller 30 may calculate the predetermined interval and perform the irregular process in an area in which the total deviation of the image pitch k and the barrier pitch Bp in the horizontal direction exceeds a predetermined amount. For example, the controller 30 may calculate the predetermined interval and perform the irregular process in an area in which the total deviation of the image pitch k and the barrier pitch Bp in the horizontal direction exceeds a length ½ Hp, which is half the horizontal length of one subpixel 12. In this case, the predetermined interval is calculated as the period taken for the total deviation of the image pitch k and the barrier pitch Bp in the horizontal direction to be half the horizontal length of one subpixel 12 from zero. For example, the controller 30 may calculate the predetermined interval and perform the irregular process in an area in which the total deviation of the image pitch k and the barrier pitch Bp in the horizontal direction exceeds a length 1 Hp, which is the horizontal length of one subpixel 12. In this case, the predetermined interval is calculated as the period taken for the total deviation of the image pitch k and the barrier pitch Bp in the horizontal direction to be the horizontal length of one subpixel 12 from zero.

The controller 30 may specify the predetermined amount based on the horizontal length of the subpixels 12 included in the display panel 10. For example, the controller 30 may specify the length ½ Hp, half the horizontal length of one subpixel 12, as the predetermined amount. For example, the controller 30 may specify the length 1 Hp, which is the horizontal length of one subpixel 12, as the predetermined amount.

For example, the controller 30 may perform the irregular process in an area in which the total deviation of the image pitch k and the barrier pitch Bp in the horizontal direction exceeds the length ½ Hp. The controller 30 may perform the irregular process including controlling one or more predetermined subpixels 12 to display a black image. The predetermined subpixels 12 are between subpixels 12 included in a left-eye image area PgL and subpixels 12 included in a right-eye image area PgR.

For example, the controller 30 may perform the irregular process in an area in which the total deviation of the image pitch k and the barrier pitch Bp in the horizontal direction exceeds the length ½ Hp. The controller 30 may perform the irregular process including controlling one or more predetermined subpixels 12 to display a white image. The predetermined subpixels 12 are between subpixels 12 included in a left-eye image area PgL and subpixels 12 included in a right-eye image area PgR.

For example, the controller 30 may perform the irregular process in an area in which the total deviation of the image pitch k and the barrier pitch Bp in the horizontal direction exceeds the length 1 Hp. The controller 30 may perform the irregular process including adding one shutter cell S to a light transmissive area 20A in the horizontal direction and reducing one shutter cell S from a light attenuating area 20B in the horizontal direction.

For example, the controller 30 may perform the irregular process in an area in which the total deviation of the image pitch k and the barrier pitch Bp in the horizontal direction exceeds the length 1 Hp. The controller 30 may perform the irregular process including reducing one shutter cell S from a light transmissive area 20A in the horizontal direction and adding one shutter cell S to a light attenuating area 20B in the horizontal direction.

In the above examples, the controller 30 avoids defining an area that is included neither in the left-eye image area PgL nor in the right-eye image area PgR between adjacent left and right-eye image areas PgL and PgR in the display panel 10. In other words, the left-eye image area PgL and the right-eye image area PgR are immediately adjacent to each other. The display panel 10 may have another structure. For example, the display panel 10 may include an area that is included neither in the left-eye image area PgL nor in the right-eye image area PgR between adjacent left and right-eye image areas PgL and PgR. In this case, the left-eye image area PgL and the right-eye image area PgR are not adjacent to each other. For the display panel 10 including an area that is included neither in the left-eye image area PgL nor in the right-eye image area PgR between adjacent left and right-eye image areas PgR and PgL, the controller 30 may perform the irregular process including reducing the horizontal length of the area that is included neither in the left-eye image area PgL nor in the right-eye image area PgR.

The 3D display device 100 according to the present embodiment includes the controller 30 that performs the irregular process at predetermined intervals. This minimizes the deviation of the barrier pitch of the barrier panel 20 and the image pitch of the display panel 10 from their optimum values. The 3D display device 100 can thus include the display panel 10 and the barrier panel 20 having, for example, the same pitch.

Figure 5:
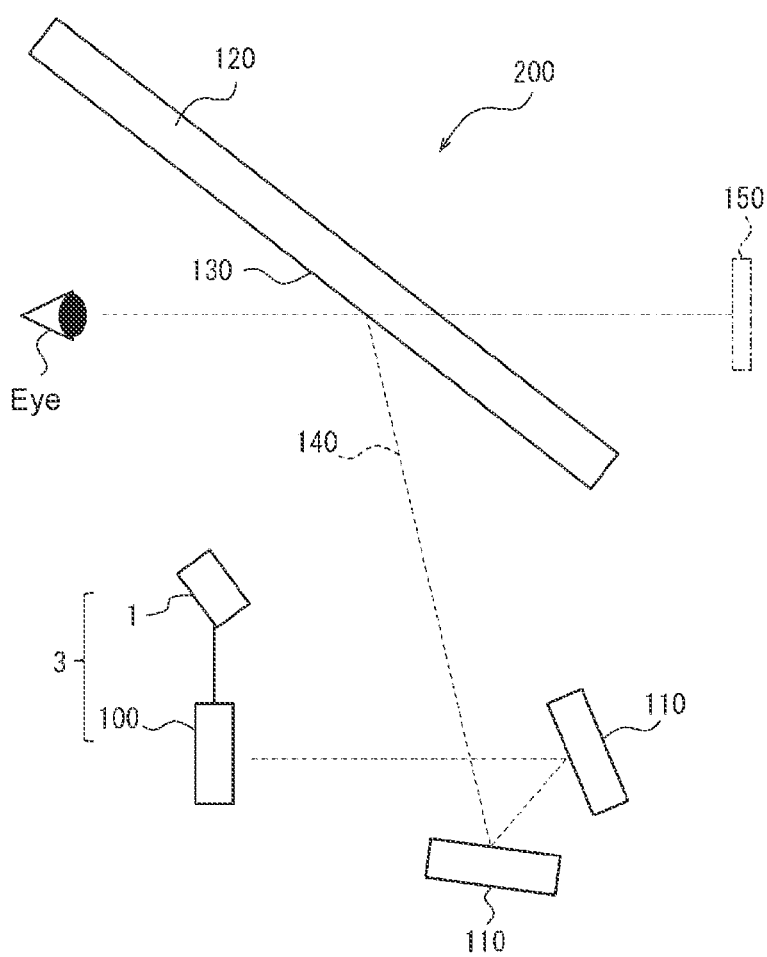
FIG. 5 is a diagram of a head-up display (HUD) incorporating a 3D display system according to the embodiment.

As shown in FIG. 5, a 3D display system 3 includes a position detector 1 and the 3D display device 100. As shown in FIG. 5, a head-up display 200 may incorporate the 3D display system 3. The head-up display 200 may be simply referred to as a HUD 200. The HUD 200 includes the 3D display system 3, optical members 110, and a projection receiver 120 including a projection screen 130. The HUD 200 directs image light from the 3D display system 3 to the projection receiver 120 with the optical members 110. In other words, the HUD 200 projects an image onto the projection receiver 120. The HUD 200 directs image light reflected on the projection receiver 120 to reach the left eye 5L and the right eye 5R of the user. In other words, the HUD 200 directs the image light to travel from the 3D display system 3 to the left eye 5L and the right eye 5R of the user along an optical path 140 indicated by a broken line. The user can visually perceive image light reaching the eyes along the optical path 140 as a virtual image 150.

The 3D display device 100 may include the position detector 1. In this case, the position detector 1 detects the position of either the left eye 5L or the right eye 5R of the user and outputs the detected position to the controller 30. The position detector 1 may include, for example, a camera. The position detector 1 may capture an image of the face of the user with the camera. The position detector 1 may detect the position of at least one of the left and right eyes 5L and 5R of the user using the image captured with the camera. The position detector 1 may detect, using the image captured with one camera, the position of at least one of the left and right eyes 5L and 5R of the user as coordinates in a 3D space. The position detector 1 may detect, using the images captured with two or more cameras, the position of at least one of the left and right eyes 5L and 5R of the user as coordinates in a 3D space.

The position detector 1 may include no camera and may be connected to an external camera. The position detector 1 may include an input terminal for receiving signals from the external camera. The external camera may be connected to the input terminal directly. The external camera may be connected to the input terminal indirectly through a shared network. The position detector 1 including no camera may include an input terminal for receiving image signals from a camera. The position detector 1 including no camera may detect the position of at least one of the left and right eyes 5L and 5R of the user from the image signal input in the input terminal.

The position detector 1 may include a sensor. The sensor may be an ultrasonic sensor or an optical sensor. The position detector 1 may detect the position of the head of the user with the sensor and determine the position of at least one of the left and right eyes 5L and 5R of the user based on the position of the head. The position detector 1 may detect, with one sensor or two or more sensors, the position of at least one of the left and right eyes 5L and 5R of the user as coordinates in a 3D space.

The position detector 1 may detect, based on a detection result of the position of at least one of the left and right eyes 5L and 5R of the user, the moving distances of the left and right eyes 5L and 5R in the first direction.

The 3D display system 3 may eliminate the position detector 1. For the 3D display system 3 eliminating the position detector 1, the controller 30 may include an input terminal for receiving signals from an external detector. The external detector may be connected to the input terminal. The external detector may use electrical or optical signals as transmission signals to the input terminal. The external detector may be connected to the input terminal indirectly through a shared network. The controller 30 may receive input of position coordinates indicating the position of at least one of the left and right eyes 5L and 5R of the user obtained from the external detector. The controller 30 may calculate, based on the position coordinates, the moving distances of the left and right eyes 5L and 5R of the user in the first direction.

Figure 6:
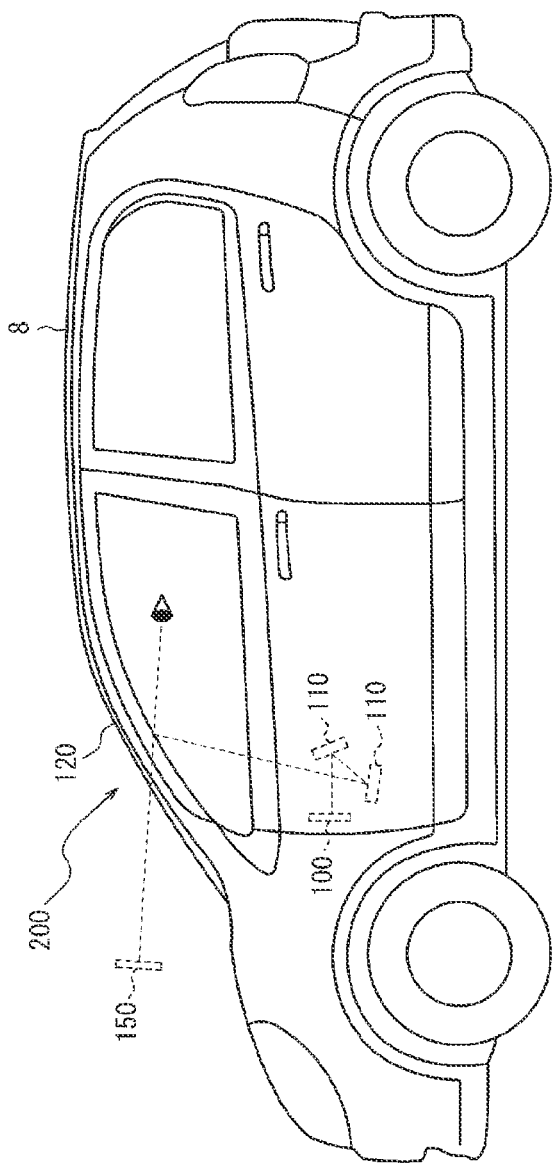
FIG. 6 is a diagram of a vehicle incorporating the HUD shown in FIG. 5.

As shown in FIG. 6, the HUD 200 including the 3D display system 3 may be mounted on a movable object 8. The HUD 200 may include components that also serve as devices or components included in the movable object 8. For example, the movable object 8 may use a windshield as the projection receiver 120. The HUD 200 and the 3D display system 3 may include components that also serve as devices or components included in the movable object 8. The devices or components of the HUD 200 or the 3D display system 3 serving as devices or components included in the movable object 8 may be referred to as HUD modules or 3D display components. The movable object according to one or more embodiments of the present disclosure includes a vehicle, a vessel, and an aircraft. The vehicle according to one or more embodiments of the present disclosure includes, but is not limited to, an automobile and an industrial vehicle, and may also include a railroad vehicle, a community vehicle, and a fixed-wing aircraft traveling on a runway. The automobile includes, but is not limited to, a passenger vehicle, a truck, a bus, a motorcycle, and a trolley bus, and may also include other vehicles traveling on a road. The industrial vehicle includes an agricultural vehicle and a construction vehicle. The industrial vehicle includes, but is not limited to, a forklift and a golf cart. The agricultural vehicle includes, but is not limited to, a tractor, a cultivator, a transplanter, a binder, a combine, and a lawn mower. The construction vehicle includes, but is not limited to, a bulldozer, a scraper, a power shovel, a crane vehicle, a dump truck, and a road roller. The vehicle includes man-powered vehicles. The classification of the vehicle is not limited to the above examples. For example, the automobile may include an industrial vehicle travelling on a road, and one type of vehicle may fall within a plurality of classes. The vessel according to one or more embodiments of the present disclosure includes a jet ski, a boat, and a tanker. The aircraft according to one or more embodiments of the present disclosure includes a fixed-wing aircraft and a rotary-wing aircraft.

First Example

Figure 7:
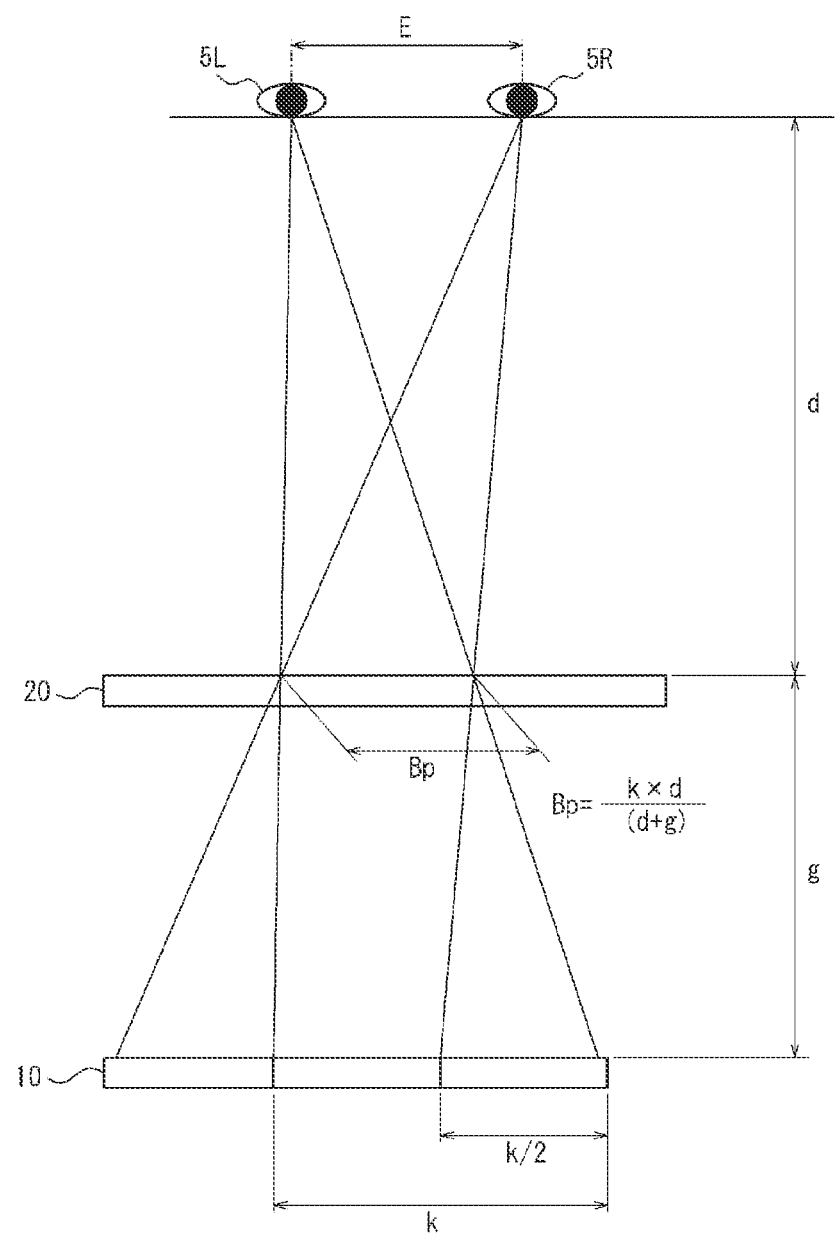
FIG. 7 is a schematic diagram describing the relationship between an interocular distance, a proper viewing distance, a gap, a barrier pitch, and an image pitch.

The relationship between an interocular distance, a proper viewing distance, a gap, a barrier pitch, and an image pitch will now be described with reference to FIG. 7. In FIG. 7, the barrier panel 20 is in front of the display panel 10 as viewed from the user. The controller 30 performs the irregular process.

As shown in FIG. 7, the distance between the left eye 5L and the right eye 5R of the user may be referred to as an interocular distance E. The distance between the barrier panel 20 and the left and right eyes 5L and 5R of the user is a proper viewing distance d. The distance between the barrier panel 20 and the display panel 10 is a gap g. Each subpixel 12 has the horizontal length Hp and the vertical length Vp. Each left-eye image area PgL or each right-eye image area PgR includes m subpixels 12. In the display panel 10, the binocular image has the image pitch k, and k=2m×Hp/b, where b is a constant. In the display panel 10, the monocular image has the image pitch k/2, and k/2=m× Hp/b, where b is a constant. The barrier panel 20 has a tilt angle θ, and tan θ=a×Hp/b×Vp, where a and b are constants.

In FIG. 7, E:d=(k/2):g and d:Bp=(d+g):k based on the similarity of the triangles. The barrier pitch of the barrier panel 20 is expressed as Bp=k×d/(d+g)=2m×Hp×d/{b×(d+g)}.

Based on the above formula expressing the barrier pitch, the barrier panel 20 is to define sets of light transmissive areas 20A and light attenuating areas 20B each including 2m×d/(d+g) consecutive shutter cells S at the tilt angle tan θ. The number of shutter cells S defining each set of a light transmissive area 20A and a light attenuating area 20B is also the number of shutter cells S corresponding to the barrier pitch.

The number of shutter cells S defining each set of a light transmissive area 20A and a light attenuating area 20B is in an integer. When p is the number of sets of light transmissive and attenuating areas 20A and 20B including 2m shutter cells S and q is the number of sets of light transmissive and attenuating areas 20A and 20B including (2m−1) shutter cells S, p and q are determined to satisfy the following expression.

$$\{2m \times p + (2m-1) \times q\}/(p+q) = 2m \times d/(d+g) \quad (1)$$

For example, when a=1, b=1, m=6, k=12 Hp, d=500, and g=1, 2m×d/(d+g)=(12 Hp×500)/(500+1)=11.98 Hp. In this case, the formula (1) holds when p=49 and q=1. In other words, the barrier panel 20 includes forty-nine sets of light transmissive and attenuating areas 20A and 20B each including twelve shutter cells S and one set of light transmissive and attenuating areas 20A and 20B including eleven shutter cells S arranged in sequence. This arrangement is referred to as a cycle pitch of 12 Hp:49 and 11 Hp:1, where 1 Hp corresponds to one shutter cell S.

For the barrier pitch corresponding to twelve shutter cells S, the barrier panel 20 may define, for example, twelve shutter cells S arranged in the first direction as a group of shutter cells. A group of shutter cells defined in the barrier panel 20 may include six consecutive shutter cells S serving as a light transmissive area 20A and the other six shutter cells S serving as a light attenuating area 20B.

For the cycle pitch of 12 Hp:49 and 11 Hp:1, forty-nine shutter cell groups each including twelve shutter cells S and one shutter cell group including eleven shutter cells S are arranged in sequence in the first direction. In this example, the forty-nine shutter cell groups each including twelve shutter cells S are referred to as regular groups. The single shutter cell group including eleven shutter cells S is referred to as an irregular group. In other words, the controller 30 performs the irregular process on the barrier panel 20 including placing, at predetermined intervals, the irregular group in the regular groups arranged in the first direction. The controller 30 varies the number of shutter cells S serving as a light transmissive area 20A or a light attenuating area 20B included in each regular group and the irregular group.

For example, the controller 30 may reduce, from a regular group including the twelve shutter cells S, one shutter cell S serving as either a light transmissive area 20A or a light attenuating area 20B, thus defining an irregular group including eleven shutter cells S. Reducing a shutter cell S included in a light transmissive area 20A causes less crosstalk than reducing a shutter cell S included in a light attenuating area 20B.

Second Example

Figure 8:
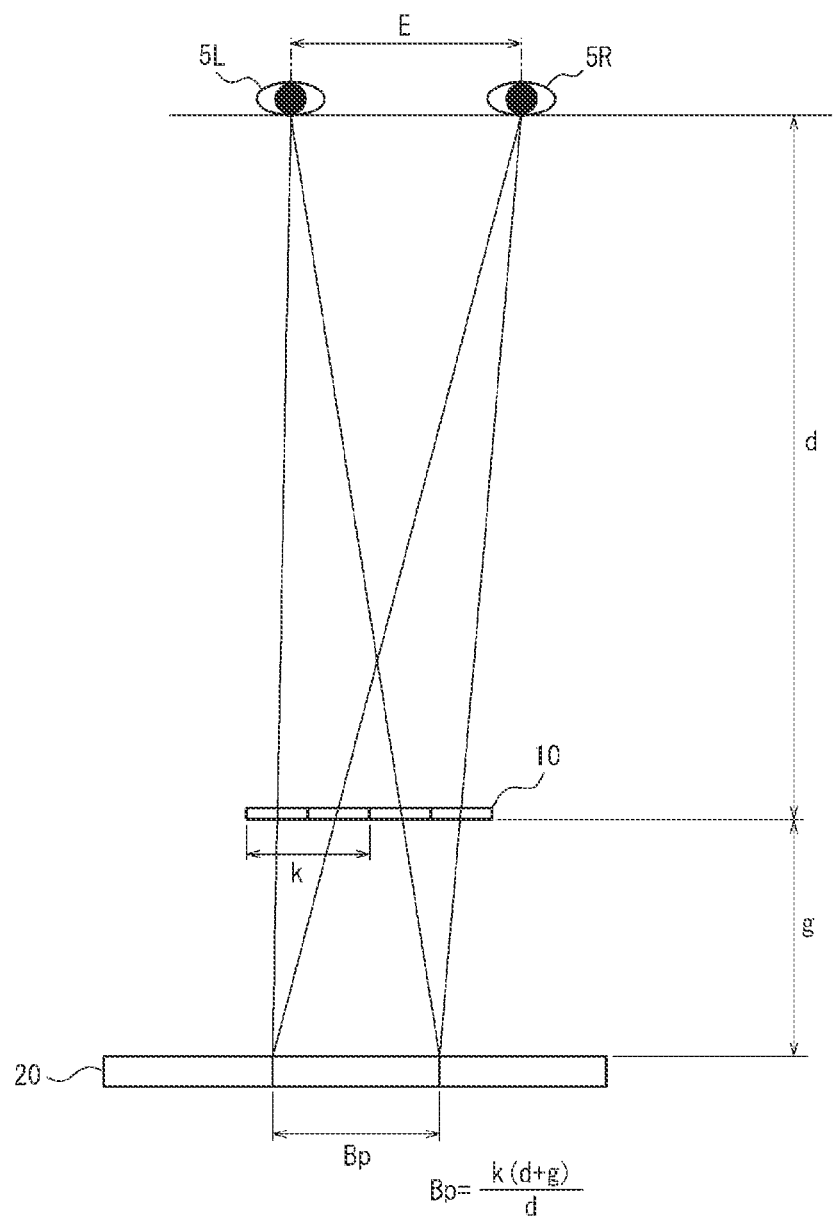
FIG. 8 is a schematic diagram describing the relationship between an interocular distance, a proper viewing distance, a gap, a barrier pitch, and an image pitch.

The relationship between an interocular distance, a proper viewing distance, a gap, a barrier pitch, and an image pitch will now be described with reference to FIG. 8. In FIG. 8, the barrier panel 20 is located behind the display panel 10 as viewed from the user. The controller 30 performs the irregular process.

In FIG. 8, E:d=Bp:(d+g) and (k/2):g=E:(d+g) based on the similarity of the triangles. The barrier pitch of the barrier panel 20 is expressed as $Bp=k\times(d+g)/d=2m\times Hp\times(d+g)/\{b\times d\}$.

Based on the above formula expressing the barrier pitch, the barrier panel 20 is to define sets of light transmissive areas 20A and light attenuating areas 20B each including $2m\times(d+g)/d$ consecutive shutter cells S at the tilt angle tan θ.

The number of shutter cells S defining each set of a light transmissive area 20A and a light attenuating area 20B is in an integer. When p is the number of sets of light transmissive and attenuating areas 20A and 20B including 2m shutter cells S and q is the number of sets of light transmissive and attenuating areas 20A and 20B including (2m+1) shutter cells S, p and q are determined to satisfy the following expression.

$$\{2m\times p+(2m+1)\times q\}/(p+q)=2m\times(d+g)/d \quad (2)$$

For example, when a=1, b=1, m=6, k=12 Hp, d=500, and g=1, $2m\times(d+g)/d=(12\ Hp\times(500+1))/500=12.024\ Hp$. In this case, the formula (2) holds when p=49 and q=1. In other words, the barrier panel 20 includes forty-nine sets of light transmissive and attenuating areas 20A and 20B each including twelve shutter cells S and one set of light transmissive and attenuating areas 20A and 20B including thirteen shutter cells S arranged in sequence. This arrangement is referred to as a cycle pitch of 13 Hp:1 and 12 Hp:49.

For the cycle pitch of 12 Hp:49 and 13 Hp:1, forty-nine shutter cell groups each including twelve shutter cells S and one shutter cell group including thirteen shutter cells S are arranged in sequence in the first direction. In this example, the forty-nine shutter cell groups each including twelve shutter cells S are referred to as regular groups. The single shutter cell group including thirteen shutter cells S is referred to as an irregular group. In other words, the controller 30 performs the irregular process on the barrier panel 20 including placing, at predetermined intervals, the irregular group in the regular groups arranged in the first direction. The controller 30 varies the number of shutter cells S serving as a light transmissive area 20A or a light attenuating area 20B included in each regular group and the irregular group.

For example, the controller 30 may add, to a regular group including twelve shutter cells S, one shutter cell S to be either a light transmissive area 20A or a light attenuating area 20B, thus defining the irregular group including thirteen shutter cells S. Adding a shutter cell S to be a light attenuating area 20B causes less crosstalk than adding a shutter cell S to be a light transmissive area 20A.

Third Example

Figure 9:
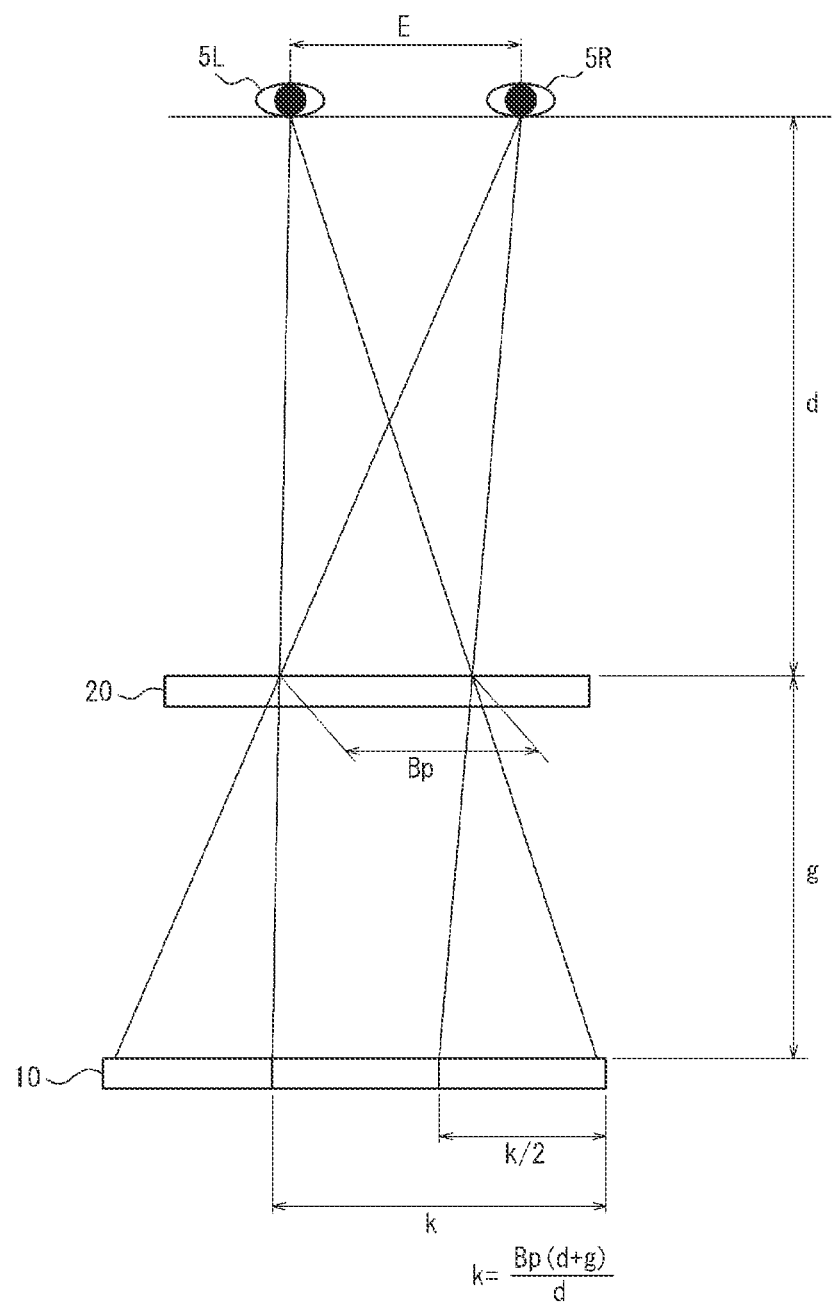
FIG. 9 is a schematic diagram describing the relationship between an interocular distance, a proper viewing distance, a gap, a barrier pitch, and an image pitch.

The relationship between an interocular distance, a proper viewing distance, a gap, a barrier pitch, and an image pitch will now be described with reference to FIG. 9. In FIG. 9, the barrier panel 20 is in front of the display panel 10 as viewed from the user. The controller 30 performs the irregular process.

In FIG. 9, E:d=(k/2):g and d:Bp=(d+g):k based on the similarity of the triangles. The binocular image pitch of the display panel 10 is expressed as $k=Bp\times(d+g)/d=2m\times Hp\times(d+g)/\{b\times d\}$. The monocular image pitch of the display panel 10 is expressed as $k/2=Bp\times(d+g)/2d=2m\times Hp\times(d+g)/2\{b\times d\}$.

Based on the above formulas expressing the image pitches, the display panel 10 is to define sets of left-eye images and right-eye images each including $2m\times(d+g)/d$ consecutive subpixels 12 at the tilt angle tan θ. The number of subpixels 12 defining each set of a left-eye image and a right-eye image is also the number of subpixels corresponding to an image pitch.

The number of subpixels 12 defining each set of a left-eye image and a right-eye image is in an integer. When p is the number of sets of left and right-eye images including 2m subpixels 12 and q is the number of sets of left and right-eye images including (2m+1) subpixels 12, p and q are determined to satisfy the following expression.

$$\{2m\times p+(2m+1)\times q\}/(p+q)=2m\times(d+g)/d \quad (3)$$

For example, when a=1, b=1, m=6, Bp=12 Hp, d=500, and g=1, $2m\times(d+g)/d=(12\ Hp\times(500+1))/500=12.024\ Hp$. In this case, the formula (3) holds when p=49 and q=1. In other words, the display panel 10 includes forty-nine sets of left and right-eye images each including twelve subpixels 12 and one set of left and right-eye images including thirteen subpixels 12 arranged in sequence. This arrangement is referred to as a cycle pitch of 13 Hp:1 and 12 Hp:49, where 1 Hp corresponds to one subpixel 12.

For the image pitch corresponding to twelve subpixels 12, for example, the twelve subpixels 12 arranged in the first direction may be defined as a group of subpixels. The subpixel group in the display panel 10 may display one left-eye image on six consecutive subpixels 12 and one right-eye image on the other six subpixels 12.

For a cycle pitch of 12 Hp:49 and 13 Hp:1, forty-nine subpixel groups each including twelve subpixels 12 and one subpixel group including thirteen subpixels 12 are arranged in sequence in the first direction. In this example, the forty-nine subpixel groups each including twelve subpixels 12 are referred to as regular groups. The single subpixel group including thirteen subpixels 12 is referred to as an irregular group. In other words, the controller 30 performs the irregular process including placing, at predetermined intervals, the irregular group in the regular groups arranged in the first direction. The controller 30 varies the number of subpixels 12 displaying a left-eye image included in the irregular group or the number of subpixels 12 displaying a right-eye image included in the irregular group.

For example, the controller 30 may add, to a regular group including twelve shutter cells S, one subpixel 12 displaying either a left-eye image or a right-eye image, thus defining the irregular group including thirteen shutter cells S. The controller 30 may add one subpixel 12 displaying a black image or a white image to a regular group including twelve subpixels 12. Adding a subpixel 12 displaying a black image causes less crosstalk than adding a subpixel 12 displaying a right-eye image or a left-eye image.

Fourth Example

Figure 10:
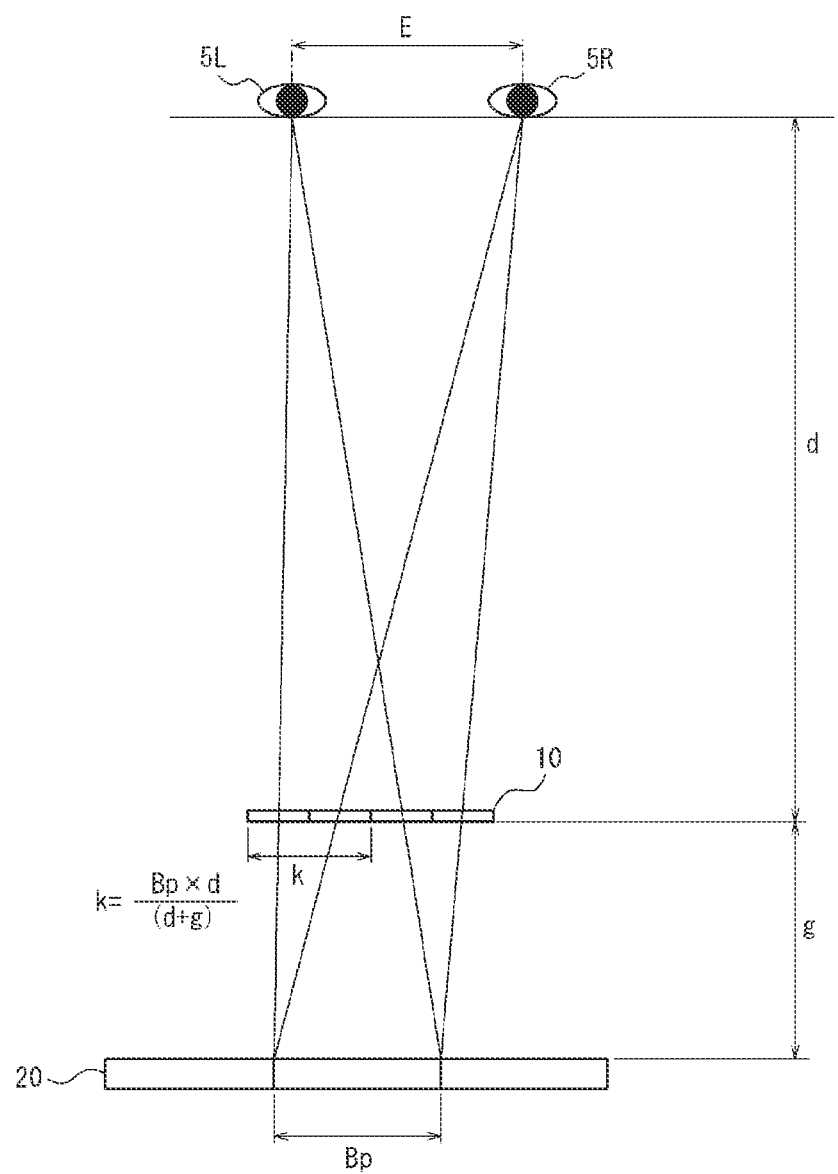
FIG. 10 is a schematic diagram describing the relationship between an interocular distance, a proper viewing distance, a gap, a barrier pitch, and an image pitch.

The relationship between an interocular distance, a proper viewing distance, a gap, a barrier pitch, and an image pitch will now be described with reference to FIG. 10. In FIG. 10, the barrier panel 20 is located behind the display panel 10 as viewed from the user. The controller 30 performs the irregular process.

In FIG. 10, k:d=Bp:(d+g) and k/2:g=E:(d+g) based on the similarity of the triangles. The binocular image pitch of the display panel 10 is expressed as k=Bp×d/(d+g)=2m×Hp×d/{b×(d+g)}. The monocular image pitch of the display panel 10 is expressed as k/2=Bp×d/2(d+g)=2m×Hp×d/2{b×(d+g)}.

Based on the above formulas expressing the image pitches, the display panel 10 is to define sets of left-eye images and a right-eye images each including 2m×d/(d+g) consecutive subpixels 12 at the tilt angle tan θ.

The number of subpixels 12 defining each set of a left-eye image and a right-eye image is in an integer. When p is the number of sets of left and right-eye images including 2m subpixels 12 and q is the number of sets of left and right-eye images including (2m+1) subpixels 12, p and q are determined to satisfy the following expression.

$$\{2m \times p + (2m+1) \times q\}/(p+q) = 2m \times d/(d+g) \quad (4)$$

For example, when a=1, b=1, m=6, Bp=12 Hp, d=500, and g=1, 2m×d/(d+g)=(12 Hp×500)/(500+1)=11.98 Hp. In this case, the formula (4) holds when p=49 and q=1. In other words, the display panel 10 includes forty-nine sets of left and right-eye images each including twelve subpixels 12 and one set of left and right-eye images including eleven subpixels 12 arranged in sequence. This arrangement is referred to as a cycle pitch of 11 Hp:1 and 12 Hp:49.

For a cycle pitch of 12 Hp:49 and 11 Hp:1, forty-nine subpixel groups each including twelve subpixels 12 and one subpixel group including eleven subpixels 12 are arranged in sequence in the first direction. In this example, the subpixel groups each including twelve subpixels 12 correspond to regular groups. The subpixel group including eleven subpixels 12 corresponds to an irregular group.

For example, the controller 30 may reduce, from a regular group including twelve subpixels 12, one subpixel 12 displaying either a left-eye image or a right-eye image, thus defining the irregular group including eleven subpixels 12. The controller 30 may reduce, from a regular group including twelve subpixels 12, one subpixel 12 displaying a left-eye image and one subpixel 12 displaying a right-eye image and add, to the regular group, one subpixel 12 displaying a black image or a white image. Reducing subpixels 12 displaying a left-eye image and a right-eye image and adding a subpixel 12 displaying a black image causes less crosstalk than reducing a subpixel 12 displaying either a left-eye image or a right-eye image.

Figure 11:
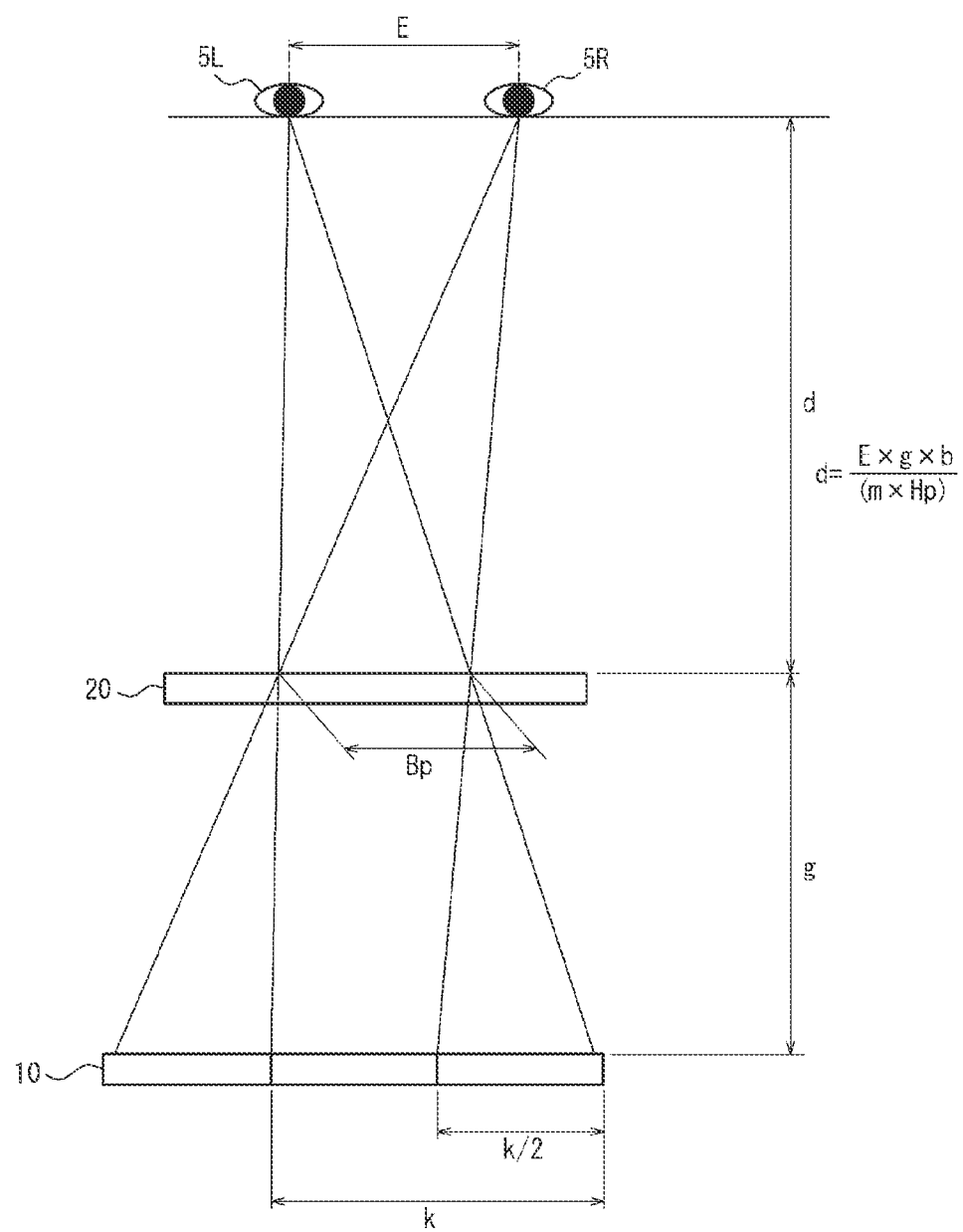
FIG. 11 is a schematic diagram describing the relationship between an interocular distance, a proper viewing distance, a gap, a barrier pitch, and an image pitch.

As shown in FIG. 11, when the proper viewing distance d is determined based on the spread of the light rays, the number m of subpixels 12 included in each left-eye image area PgL or in each right-eye image area PgR is group before the proper viewing distance d between the barrier panel 20 and the left and right eyes 5L and 5R of the user is determined. This determines the width w (=2E/m) of each subpixel 12 at the proper viewing distance. The width w of each subpixel 12 is then used to determine the number of subpixels 12 to be added or reduced. For example, with m subpixels 12 included in each left-eye image area PgL or in each right-eye image area PgR, the image pitch k=2m×Hp/b, where b is a constant, and the proper viewing distance d=(E×g×b)/(m×Hp), where b is a constant. The controller 30 may thus add one subpixel 12 displaying a left-eye image or a right-eye image based on the width w=2E/m of each subpixel 12 at the proper viewing distance d.

Fifth Example

In one or more embodiments described above, the left-eye image areas PgL and the right-eye image areas PgR in the display panel 10 occur repeatedly in the horizontal direction. In the vertical direction, the left-eye image areas PgL and the right-eye image areas PgR occur repeatedly at positions shifted by one subpixel 12 in the horizontal direction. The left-eye image areas PgL and the right-eye image areas PgR may be arranged in different manners. For example, the left-eye image areas PgL and the right-eye image areas PgR in the display panel 10 may occur repeatedly both in the horizontal and vertical directions. In this case, the barrier panel 20 defines the light transmissive areas 20A and the light attenuating area 20B to cause image light from the subpixels 12 to be transmitted or attenuated at the same time at positions corresponding to the left-eye image areas PgL and the right-eye image areas PgR in the display panel 10. More specifically, each shutter cell S in the barrier panel 20 may be sized to transmit image light from an image with the size of one subpixel 12 to either eye of the user. In this structure, the controller 30 controls the multiple shutter cells S arranged consecutively in the horizontal direction into the light transmissive state. The controller 30 controls the multiple shutter cells S in the light transmissive state arranged consecutively in the horizontal direction to be at positions shifted in the vertical direction by the horizontal length of one shutter cell S.

In one or more embodiments described above, the barrier panel 20 is in front of the display panel 10 as viewed from the user. The barrier panel 20 may be located variously as appropriate depending on the type of the display panel 10. For the display panel 10 being a backlight transmissive display panel, for example, the barrier panel 20 may be in front of or behind the display panel 10 as viewed from the user. For the display panel 10 being a self-luminous display panel, for example, the barrier panel 20 may be in front of the display panel 10 as viewed from the user.

The 3D display device 100 may include an illuminator located adjacent to one surface of the display panel 10 to illuminate the surface of the display panel 10. The illuminator may include a light source, a light guide plate, a diffuser plate, and a diffuser sheet. The illuminator emits illumination light using the light source and spreads the illumination light uniformly for illuminating the surface of the display panel 10 using, for example, the light guide plate, the diffuser plate, or the diffuser sheet. The illuminator emits the uniform light toward the display panel 10.

Although the above embodiments are described as typical examples, various modifications and substitutions to the embodiments are apparent to those skilled in the art without departing from the spirit and scope of the present disclosure. Thus, the above embodiments should not be construed to be restrictive, but may be variously modified or altered within the scope of the present disclosure. For example, multiple structural blocks described in the above embodiments or examples may be combined into a structural block, or each structural block may be divided.

The drawings used to describe the structures of one or more embodiments of the present disclosure are schematic and are not drawn to scale relative to the actual size of each component.

In the present disclosure, the first, the second, or others are identifiers for distinguishing the components. The identifiers of the components distinguished with the first, the second, and others in the present disclosure are interchangeable. For example, the first eye can be interchangeable with the second eye. The identifiers are to be interchanged together. The components for which the identifiers are interchanged are also to be distinguished from one another. The identifiers may be eliminated. The components without such identifiers can be distinguished with reference numerals. The identifiers such as the first and the second in the present disclosure alone should not be used to determine the orders of the components or to determine the existence of smaller number identifiers.

In the present disclosure, X-axis, Y-axis, and Z-axis are used for ease of explanation and are interchangeable. The orthogonal coordinate system including X-axis, Y-axis, and Z-axis is used to describe the structures according to the present disclosure. The positional relationship between the components of the present disclosure is not limited to the orthogonal relationship.

REFERENCE SIGNS LIST

1 position detector
2 3D display system
5L left eye
5R right eye
8 movable object
10 display panel
10A display surface
12 subpixel
20 barrier panel
20A light transmissive area
20B light attenuating area
30 controller
50 black matrix
100 3D display device
110 optical member
120 projection receiver
130 projection screen
140 optical path
150 virtual image
200 head-up display
S shutter cell

The invention claimed is:

1. A head-up display, comprising:
a three-dimensional display device; and
a projection receiver including a projection screen,
wherein the three-dimensional display device includes
a display panel configured to display a plurality of images,
a barrier panel at a position overlapping the display panel to change a relative attenuation amount of image light emitted from the display panel, and
a controller configured to control the display panel and the barrier panel,
the controller defines a plurality of first image areas and a plurality of second image areas in the display panel,
causes the plurality of first image areas to be at first intervals in a first direction,
causes the display panel to display, in the plurality of first image areas, a first image viewable by a first eye of a user,
causes the display panel to display, in the plurality of second image areas, a second image viewable by a second eye of the user,
defines a plurality of first transmissive areas and a plurality of second transmissive areas in the barrier panel, the plurality of first transmissive areas being transmissive to the image light at a first transmissivity, the plurality of second transmissive areas being transmissive to the image light at a second transmissivity,
causes the plurality of first transmissive areas to be at second intervals in the first direction, and
performs an irregular process at third intervals in the first direction, and
the three-dimensional display device projects the image light onto the projection screen to allow the user to view the first image and the second image through the projection screen,
wherein the barrier panel includes a plurality of shutter cells, each shutter cell of the plurality of shutter cells included in one of the plurality of first transmissive areas or the plurality of second transmissive areas, and
the controller performs, on the barrier panel, the irregular process including placing, at the third intervals, an irregular group in regular groups arranged in the first direction, the regular groups arranged in the first direction, the regular groups each including a first number of the plurality of shutter cells, the irregular group including a second number of the plurality of shutter cells, the second number being different from the first number.

2. The head-up display according to claim 1, wherein the controller determines the third intervals based on a total deviation of the first intervals and the second intervals in the first direction.

3. The head-up display according to claim 2, wherein the controller determines the third intervals based on a length of each of a plurality of subpixels included in the display panel in the first direction and the total deviation.

4. A movable object, comprising:
a head-up display including
a three-dimensional display device, and
a projection receiver including a projection screen,
wherein the three-dimensional display device includes
a display panel configured to display a plurality of images,
a barrier panel at a position overlapping the display panel to change a relative attenuation amount of image light emitted from the display panel, and
a controller configured to control the display panel and the barrier panel,
the controller defines a plurality of first image areas and a plurality of second image areas in the display panel,
causes the plurality of first image areas to be at first intervals in a first direction, causes the display panel to display, in the plurality of first image areas, a first image viewable by a first eye of a user, causes the display panel to display, in the plurality of second image areas, a second image viewable by a second eye of the user, defines a plurality of first transmissive areas and a plurality of second transmissive areas in the barrier panel, the plurality of first transmissive areas being transmissive to the image light at a first transmissivity, the plurality of second transmissive areas being transmissive to the image light at a second transmissivity, causes the plurality of first transmissive areas to be at second intervals in the first direction, and performs an irregular process at third intervals in the first direction, and the three-dimensional display device projects the image light onto the projection screen to allow the user to view the first image and the second image through the projection screen, wherein the barrier panel includes a plurality of shutter cells, each shutter cell of the plurality of shutter cells included in one of the plurality of first transmissive areas or the plurality of second transmissive areas, and the controller performs, on the barrier panel, the irregular process including placing, at the third intervals, an irregular group in regular groups, each regular group including a first number of the plurality of shutter cells, the irregular group including a second number of the plurality of shutter cells, the second number being different from the first number.

5. The movable object according to claim 4, wherein the controller determines the third intervals based on a total deviation of the first intervals and the second intervals in the first direction.

6. The movable object according to claim 5, wherein the controller determines the third intervals based on a length of each of a plurality of subpixels included in the display panel in the first direction and the total deviation.

7. A three-dimensional display device, comprising:
a display panel configured to display a plurality of images;
a barrier panel at a position overlapping the display panel to change a relative attenuation amount of image light emitted from the display panel; and
a controller configured to control the display panel and the barrier panel,
wherein the controller defines a plurality of first image areas and a plurality of second image areas in the display panel,
causes the plurality of first image areas to be at first intervals in a first direction,
causes the display panel to display, in the plurality of first image areas, a first image viewable by a first eye of a user,
causes the display panel to display, in the plurality of second image areas, a second image viewable by a second eye of the user,
defines a plurality of first transmissive areas and a plurality of second transmissive areas in the barrier panel, the plurality of first transmissive areas being transmissive to the image light at a first transmissivity, the plurality of second transmissive areas being transmissive to the image light at a second transmissivity,
causes the plurality of first transmissive areas to be at second intervals in the first direction, and performs an irregular process at third intervals in the first direction, wherein the barrier panel includes a plurality of shutter cells, each shutter cell of the plurality of shutter cells included in one of the plurality of first transmissive areas or the plurality of second transmissive areas, and the controller performs, on the barrier panel, the irregular process including placing, at the third intervals, an irregular group in the regular groups arranged in the first direction, the regular groups each including a first number of the plurality of shutter cells, the irregular group including a second number of the plurality of shutter cells, the second number being different from the first number.

8. The three-dimensional display device according to claim 7, wherein
the controller determines the third intervals based on a total deviation of the first intervals and the second intervals in the first direction.

9. The three-dimensional display device according to claim 8, wherein
the controller determines the third intervals based on a length of each of a plurality of subpixels included in the display panel in the first direction and the total deviation.

10. The three-dimensional display device according to claim 7, wherein
the controller causes the plurality of first image areas and the plurality of second image areas to be alternate in the display panel, and
causes the plurality of first transmissive areas and the plurality of second transmissive areas to be alternate in the barrier panel.

11. The three-dimensional display device according to claim 7, wherein
for the barrier panel in front of the display panel as viewed from the user, the controller defines the irregular group by reducing, from at least one of the regular groups, at least one shutter cell included in the first transmissive area of the plurality of first transmissive areas.

12. The three-dimensional display device according to claim 7, wherein
for the barrier panel behind the display panel as viewed from the user, the controller defines the irregular group by adding, to at least one of the regular groups, at least one shutter cell to be included in the second transmissive area of the plurality of second transmissive areas.

13. A three-dimensional display device comprising:
a display panel configured to display a plurality of images;
a barrier panel at a position overlapping the display panel to change a relative attenuation amount of image light emitted from the display panel; and
a controller configured to control the display panel and the barrier panel,
wherein the controller defines a plurality of first image areas and a plurality of second image areas in the display panel,
causes the plurality of first image areas to be at first intervals in a first direction,
causes the display panel to display, in the plurality of first image areas, a first image viewable by a first eye of a user,
defines a plurality of first transmissive areas and a plurality of second transmissive areas in the barrier panel, the plurality of first transmissive areas being transmissive to the image light at a first transmissivity, the plurality of second transmissive areas being transmissive to the image light at a second transmissivity, causes the plurality of first transmissive areas to be at second intervals in the first direction, and performs an irregular process at third intervals in the first direction, wherein the display panel includes subpixels configured to display an image, and the controller performs, on the display panel, the irregular process including placing, at the third intervals, an irregular group in regular groups arranged in the first direction, the regular groups each including a first number of the subpixels, the irregular group including a second number of the subpixels, the second number being different from the first number.

14. The three-dimensional display device according to claim 13, wherein for the barrier panel in front of the display panel as viewed from the user, the controller defines the irregular group by adding, to at least one of the regular groups, at least one subpixel to display the first image, the second image, or a black image.

15. The three-dimensional display device according to claim 13, wherein for the barrier panel behind the display panel as viewed from the user, the controller defines the irregular group by reducing, from at least one of the regular groups, at least one subpixel to display the first image or the second image.

16. A three-dimensional display system, comprising:

a position detector configured to detect a position of an eye of a user; and a three-dimensional display device, wherein the three-dimensional display device includes a display panel configured to display a plurality of images, a barrier panel at a position overlapping the display panel to change a relative attenuation amount of image light emitted from the display panel, and a controller configured to control the display panel and the barrier panel, and the controller defines a plurality of first image areas and a plurality of second image areas in the display panel, causes the plurality of first image areas to be at first intervals in a first direction, causes the display panel to display, in the plurality of first image areas, a first image viewable by a first eye of a user, causes the display panel to display, in the plurality of second image areas, a second image viewable by a second eye of the user, defines a plurality of first transmissive areas and a plurality of second transmissive areas in the barrier panel, the plurality of first transmissive areas being transmissive to the image light at a first transmissivity, the plurality of second transmissive areas being transmissive to the image light at a second transmissivity, causes the plurality of first transmissive areas to be at second intervals in the first direction, and performs an irregular process at third intervals in the first direction, wherein the barrier panel includes a plurality of shutter cells, each shutter cell of the plurality of shutter cells included in one of the plurality of first transmissive areas or the plurality of second transmissive areas, and the controller performs, on the barrier panel, the irregular process including placing, at the third intervals, an irregular group in regular groups arranged in the first direction, the regular groups each including a first number of the plurality of shutter cells, the irregular group including a second number of the plurality of shutter cells, the second number being different from the first number.

17. The three-dimensional display system according to claim 16, wherein the controller determines the third intervals based on a total deviation of the first intervals and the second intervals in the first direction.

18. The three-dimensional display system according to claim 17, wherein the controller determines the third intervals based on a length of each of a plurality of subpixels included in the display panel in the first direction and the total deviation.

* * * * *